United States Patent [19]

Dalton, Jr. et al.

[11] 4,336,238

[45] Jun. 22, 1982

[54] PROCESS FOR PRODUCING HYDROGEN PEROXIDE

[75] Inventors: Augustine I. Dalton, Jr.; Eugene J. Greskovich; Ronald W. Skinner, all of Allentown, Pa.

[73] Assignee: Air Products and Chemicals, Inc., Allentown, Pa.

[21] Appl. No.: 195,828

[22] Filed: Oct. 10, 1980

[51] Int. Cl.$^3$ .............................................. C01B 15/02
[52] U.S. Cl. ................................ 423/584; 252/411 R; 252/413
[58] Field of Search ........................................ 423/584

[56] References Cited

U.S. PATENT DOCUMENTS 4,279,883  7/1981  Izuml et al. .................... 423/584

Primary Examiner—O. R. Vertiz
Assistant Examiner—Wayne A. Langel
Attorney, Agent, or Firm—James C. Simmons; E. Eugene Innis

[57] ABSTRACT

An improvement in a process for producing hydrogen peroxide by contacting a mixture of hydrogen and oxygen with a palladium on carbon catalyst in the presence of an acidic aqueous liquid capable of inhibiting decomposition of hydrogen peroxide comprises prolonging the useful life of the catalyst by continuous removal of palladium salts produced by solubilization of the catalyst from the acidic aqueous liquid.

11 Claims, No Drawings

PROCESS FOR PRODUCING HYDROGEN PEROXIDE

BACKGROUND OF THE INVENTION

1. Field of the Invention

This invention relates to an improvement in the manufacture of hydrogen peroxide from hydrogen and oxygen.

2. Prior Art

It has been proposed by Hooper, in U.S. Pat. No. 3,336,112, that preparation of hydrogen peroxide from its elements with a solid catalyst in the liquid phase in the presence of water can be done in the presence of a sequestrative stabilizer for hydrogen peroxide. This reference proposes that the liquid reaction mixture can be caused to flow over catalyst pellets and the use of towers packed with catalyst for a continuous process.

It has further been proposed by Hooper, in U.S. Pat. No. 3,361,533, that hydrogen peroxide synthesized from its elements, hydrogen and oxygen, in an aqueous liquid medium capable of inhibiting the decomposition of hydrogen peroxide in the presence of a solid catalyst, can be used directly for oxidation of an oxidizable organic material. It has been proposed to carry out the oxidation reaction by passing the liquid material containing the material being oxidized over a bed of catalyst countercurrent to a stream of hydrogen and oxygen.

Kim et al, in U.S. Pat. No. 4,007,256, disclose a similar direct process with countercurrent flow of an acidic aqueous medium containing an oxidizable material and of hydrogen and oxygen. The aqueous medium also contains a nitrogenous organic co-solvent.

Henkel et al, in U.S. Pat. No. 1,108,752, have proposed a process of producing hydrogen peroxide from its elements, in which hydrogen peroxide is removed continuously as it is formed and a corresponding volume of water is fed to the reaction. The catalyst is clay pipe impregnated with palladium.

SUMMARY OF THE INVENTION

In accordance with the present invention, there is provided an improvement in a process for producing hydrogen peroxide directly from hydrogen and oxygen, employing a palladium on carbon catalyst in an acidic aqueous liquid, comprising prolonging effective catalyst life by continuously removing palladium salts produced by catalyst solubilization from the acidic aqueous liquid.

DETAILED DESCRIPTION

Comparative tests of palladium on silica gel and carbon under batch reactor conditions similar to those of the Hooper U.S. Pat. No. 3,336,112, supra, surprisingly indicated that loss of palladium by solubilization was markedly lower for palladium on carbon catalysts than for the other catalysts and that palladium on carbon catalyst gave the highest yields of hydrogen peroxide.

However, one or more products of the hydrogen peroxide synthesis markedly decrease the activity of the palladium on carbon catalyst, as shown by a plateau in or reduction of hydrogen peroxide concentration at long reaction times:

(1) Catalyst used in batch preparation of hydrogen peroxide is not restored to its initial activity by removal from the reactor, treatment with solvent and drying.

(2) Addition of soluble palladium, in the form of $PdCl_4^=$, to a batch reaction for synthesizing hydrogen peroxide markedly reduces hydrogen peroxide yield in comparison to batches containing no soluble palladium at the outset.

(3) Pretreatment of palladium on carbon catalyst with hydrogen peroxide markedly decreases the activity of the catalyst in batch synthesis of hydrogen peroxide.

It was surprisingly found that synthesizing hydrogen peroxide by a continuous process using a carbon catalyst support resulted in substantially higher catalyst life than in batch processes. A further advantage is a significant lowering of organic peroxide level compared to batch processes. In a continuous run lasting 100 hours, 9400 moles of hydrogen peroxide were produced per mole of palladium with 30% loss of catalyst activity. Catalyst used in a batch operation, without provision for removal of soluble palladium salts, was completely deactivated in 3 hr and produced only about 364 moles of hydrogen peroxide per mole of palladium.

It is thought that the continuous process is superior to the batch process because removal of $PdCl_4^=$ or other soluble palladium species avoids the danger of catalyst inactivation by redeposition of palladium.

An unexpected aspect of the continuous reaction or batch reaction with removal of palladium salts is that the concentrations of either of hydrochloric acid or sulfuric acid, or of both, in the reaction mixture can be decreased without loss of selectivity. In a continuous run lasting 285 hours, 18,500 moles of hydrogen peroxide per mole of palladium had been obtained after 185 hr using solvent which was 0.05 N in sulfuric acid and 0.0013 N in hydrochloric acid.

Aqueous liquids contemplated for use in the practice of this invention are those containing up to 95% by volume of an aldehyde, ketone or alcohol or other oxygenated organic solvent. Nitrogeneous solvents such as disclosed by Kim, supra, can also be used. Preferably, the solvent will contain 70–90% by volume of an alcohol or ketone, most preferably acetone or methanol.

The acidic aqueous liquid contains either hydrochloric acid or sulfuric acid, or both. The preferred range of hydrochloric acid during normal operation is 0.0005–0.005 N and of sulfuric acid 0.025–0.2 N. Preferably, both acids are present and the overall acidity of the acidic aqueous liquid is 0.0255–0.205 N.

A variety of reactor configurations can be used to achieve continuous removal of palladium-containing dilute hydrogen peroxide solution from the site of synthesis.

(1) Batch reactor comprising a reactor vessel, stirring means, means for introducing hydrogen and oxygen below the surface of the liquid reaction mixture, vent means for removing gases and means external to the reactor for removal of soluble catalyst components and return of liquid to the reactor.

(2) Continuous single stage reactor comprising a reaction vessel fitted with inlets for hydrogen and oxygen below the surface of the liquid reaction mixture, stirring means, inlet and outlet for liquid product containing hydrogen peroxide and for aqueous acidic liquid, and vent means for gases.

(3) Continuous single stage reactor further fitted with means external to the reactor for recovery of soluble palladium and recycle of liquid to the reactor.

(4) Multiple stage continuous reactor with provision for external interstage palladium removal.

(5) Continuous cocurrent upward flow reactor comprising a vertical reactor packed with catalyst, provided for means for percolating hydrogen, oxygen and aqueous acidic reaction medium upwardly through the catalyst bed, venting means for gases and means at the top of the reactor for removing liquid product.

(6) Continuous countercurrent reactor comprising a vertical reactor packed with catalyst, means for introducing gas upwardly through the catalyst bed, means for passing aqueous acidic liquid downwardly through the catalyst bed, means at the bottom of the reactor for removing liquid product containing hydrogen peroxide and means at the top of the reactor for venting gases.

(7) Continuous cocurrent downflow reactor comprising a vertical reactor packed with catalyst, means for percolating acidic aqueous liquid, hydrogen and oxygen downwardly through the catalyst bed and means at the bottom of the reactor for removing gases and liquid product containing hydrogen peroxide.

(8) Continuous cross-flow reactor comprising a vertical reactor packed with catalyst, means for passing hydrogen and oxygen upwardly through the catalyst and means at the top of the reactor for venting gases, and means for passing acidic aqueous liquid horizontally across the catalyst bed and means for removing liquid product.

In the case of batch reactors or continuous reactors with liquid recycle, removal of palladium salts from the liquid product can be achieved using activated carbon or an ion-exchange resin, whereupon the liquid thus freed of palladium is recycled to the reactor until the desired peroxide concentration is attained. Representative ion-exchange resins which can be used are basic styrene-divinylbenzene copolymeric anionic exchange resins having quaternary ammonium functionality, such as Amberlite IRA-900 or IRA-938 (Rohm & Haas Co.) in the chloride form. Amberlite IRA-93 free base could be converted to the chloride form prior to use.

Of the reactor configurations described, a continuous reactor employing a packed bed of catalyst and providing for cocurrent upward flow of acidic aqueous liquid, hydrogen and oxygen and for venting of gases and removal of product from the top region of the reactor is preferred. Most preferably, the reaction medium used will be an aqueous acidic solution containing 70-90% by volume of acetone or methanol and which is 0.0005-0.005 N in hydrochloric acid and 0.25-0.2 N in sulfuric acid.

It is postulated that use of continuous packed bed reactors, in which mechanical agitation is unnecessary to maintain an even dispersion of catalyst and in which liquid and gas feed velocities can be controlled so as to avoid fluidization, result in improved catalyst life as a result of decreasing catalyst attrition occurring in other reactor configurations.

A further advantage of the cocurrent packed bed reactor is that a continuous plug flow reaction is carried out, whereby only a portion of the catalyst bed is subjected to maximum concentrations of hydrogen peroxide and dissolved palladium. Improved catalyst life is expected both because catalyst deactivation is greater at higher peroxide concentrations and because high hydrogen peroxide concentrations occur only near the reactor outlet owing to the continuous removal of soluble palladium (as $PdCl_4^=$) and hydrogen peroxide.

Another aspect of this invention is that catalysts kept free of reprecipitated palladium by the process set forth above can be reactivated by simply increasing the concentration of hydrochloric acid in the aqueous medium to about 0.01 N and of sulfuric acid to about 0.1 N for up to 20 hours.

When synthesis of hydrogen peroxide is done as above, at a temperature of 0°–30° C., deactivated catalyst can also be regenerated by increasing the temperature in the reactor to about 50° C. for up to 5 hours.

Without further elaboration, it is believed that one skilled in the art can, using the preceding description, utilize the present invention to its fullest extent. The following specific embodiments are, therefore, to be construed as merely illustrative and not limitative of the remainder of the disclosure in any way whatsoever. In the following Examples, the temperatures are set forth uncorrected in degrees Celsius. Unless otherwise indicated, all parts and percentages are by weight.

EXAMPLE 1

Two grams of 5% palladium on carbon were charged to a stirred glass batch reactor containing 275 ml of 75% acetone-25% water by volume which was 0.1 N in sulfuric acid and 0.01 N in hydrochloric acid, and contained 100 ppm of each of sodium meta- and pyrophosphates. After cooling to 0° C., hydrogen and oxygen were sparged through the solvent and catalyst at 0.6 scfh and 2.05 scfh, respectively, at a pressure of 125 psig. The concentrations of hydrogen peroxide accumulated and dissolved or soluble catalyst were determined as a function of time by titration with standardized potassium permanganate solution and atomic absorption spectroscopy, respectively.

The following results were obtained:

| Elapsed Time, hrs. | $H_2O_2$ Conc., M | Solubilized Pd $\mu g/cc$ | % of Charged Catalyst |
|---|---|---|---|
| 0.25 | 0.282 | 24.48 | 6.73 |
| 0.50 | 0.426 | 23.28 | 6.33 |
| 1.00 | 0.647 | 19.42 | 5.22 |
| 1.50 | 0.855 | 7.22 | 1.90 |
| 2.00 | 0.952 | 5.73 | 1.48 |
| 3.00 | 1.25 | 3.40 | 0.88 |
| 4.00 | 1.25 | 2.76 | 0.70 |

The catalyst had produced 364 moles of hydrogen peroxide/mole of palladium after 3 hours at which point catalyst deactivation was essentially complete.

EXAMPLE 2

Using 5% palladium on silica gel catalyst, the experiment described in Example 1 was repeated, with the following results:

| Elapsed Time, hrs. | $H_2O_2$ Conc., M | Solubilized Pd $\mu g/cc$ | % of Charged Catalyst |
|---|---|---|---|
| 0.17 | 0.08 | 29.67 | 8.16 |
| 1.00 | 0.27 | 62.25 | 17.12 |
| 5.50 | 0.73 | 65.89 | 18.12 |

These experiments indicate that higher yields of hydrogen peroxide are obtained, with less loss of palladium catalyst by dissolution, using a palladium on carbon catalyst rather than palladium supported on silica gel, a preferred catalyst of Hooper, U.S. Pat. No. 3,336,112.

EXAMPLE 3

The experiment described in Example 1 was repeated, except that the reaction was allowed to continue for a longer time and that the concentration of hydrolyzable organic peroxides, expressed as hydrogen peroxide, was determined by titration of two separate samples with standardized $KMnO_4$ solution, the first of which was titrated immediately for $H_2O_2$. The second sample was prehydrolyzed with 3% by weight of $H_2SO_4$ at room temperature to liberate $H_2O_2$ from organic peroxides. The difference between the results of the two titrations was taken as the concentration of organic peroxide.

Results obtained were:

| Elapsed Time, hrs | $H_2O_2$ Conc., M | Conc. Organic Peroxides, M |
|---|---|---|
| 1 | 0.40 | |
| 2 | 0.8 | |
| 3 | 1.1 | |
| 4 | 1.3 | 0.20 |
| 5 | 1.5 | 0.24 |
| 6 | 1.5 | 0.26 |

These data indicate that accumulation of peroxides becomes significant in aqueous acetone after long reaction periods and that hydrogen peroxide yield also levels off.

EXAMPLE 4

The experiment described in Example 1 was repeated except the concentrations of sulfuric acid and hydrochloric acid were reduced to 0.025 N and 0.0025 N, respectively.

Results were:

| Elapsed Time, hrs | $H_2O_2$ Conc., M |
|---|---|
| 0.5 | 0.5 |
| 1.0 | 0.72 |
| 2.0 | 0.94 |
| 2.5 | 0.93 |
| 2.8 | 0.68 |
| 3.5 | 0.33 |
| 4.5 | 0.30 |

This experiment demonstrates that the concentrations of sulfuric acid and hydrochloric acid cannot be significantly reduced without decreasing peroxide yield.

EXAMPLE 5

(a) At the end of 4 hours of an experiment as in Example 1, the catalyst was removed from the reaction mixture by filtration and dried. The dried catalyst was charged to a reactor containing fresh solvent mixture and the preparation of hydrogen peroxide was attempted, as in Example 1. Results were:

| Elapsed Time, hrs. | $H_2O_2$ Conc., M |
|---|---|
| 0.5 | 0.10 |
| 2.5 | 0.11 |

(b) The above experiment was repeated except that at the end of 4 hours, the catalyst was washed several times each with acetone and water and then dried. The catalyst was charged to a reactor containing fresh solvent. After 2 hours, the concentration of hydrogen peroxide was 0.06 M.

EXAMPLE 6

The influence of dissolved palladium on catalyst activity was investigated in an experiment otherwise as in Example 1, except that the solvent contained a soluble palladium compound (43 ppm of sodium tetrachloropalladate $Na_2PdCl_4$) toward which hydrogen peroxide is stable under the conditions of the reaction. The following results were obtained:

| Elapsed Time, hrs. | $H_2O_2$ Conc., M |
|---|---|
| 1 | 0.3 |
| 2 | 0.62 |
| 3 | 0.84 |
| 3.5 | 0.88 |
| 4 | 0.88 |

These results clearly indicate that soluble palladium has an adverse effect on hydrogen peroxide yield and that removal of solubilized palladium from the medium in reaction vessel is of great importance.

EXAMPLE 7

The effect of hydrogen peroxide on the palladium catalyst used for the synthesis of hydrogen peroxide from its elements was determined by stirring a suspension of 2 g of 5% palladium on carbon catalyst in 100 ml of water with 45 ml of 30% aqueous hydrogen peroxide at 0° C. Following rapid decomposition of the hydrogen peroxide, owing to the absence of inhibitors, the catalyst was filtered, dried and used in an experiment otherwise as in Example 1. At the end of 3 hours, the concentration of hydrogen peroxide was 0.03 M.

This experiment suggests that hydrogen peroxide also deactivates the catalyst used for hydrogen peroxide synthesis and indicates the desirability of withdrawing product hydrogen peroxide from the medium in the reactor.

EXAMPLE 8

A continuous reactor for the preparation of hydrogen peroxide from hydrogen and oxygen consisted of a vertical tube packed with palladium on carbon catalyst and equipped for upward cocurrent inflow of hydrogen, oxygen and solvent. Each of the inflow systems was equipped with metering means and a source of $H_2$, $O_2$ or solvent. The reactor was a pipe 5 feet in length and 1.28 inches in inner diameter, lined with polytetrafluoroethylene and jacketed to permit circulation of a cooling medium. At the top of the reactor, which was equipped with a blow-out disc, was a device for removal of liquid samples, means for transferring the reactor effluent to a liquid-gas separator and means for introducing a diluent stream of nitrogen. The gas separated in the liquid-gas separator was vented and the liquid effluent retained. Analysis for hydrogen peroxide was done as in Example 1.

A. 80% acetone—20% water by volume as solvent.

The reactor was packed with 200 gms of 0.2% palladium on carbon catalyst. A solvent consisting of 80% acetone—20% water, which was 0.1 N in sulfuric acid and 0.01 N in hydrochloric acid and contained 100 ppm of each of sodium and meta- and pyrophosphates, was passed up through the catalyst bed at the rate of 0.883 L/hr (1.6 LHSV). Hydrogen and oxygen were introduced at 1.61 and 4.61 scfh, respectively. The pressure was 150 psig and the temperature 27° C. After 4 hours, the hydrogen peroxide concentration in the effluent was 0.57 molar, which corresponds to a rate of accumulation of peroxide of 1.2 mol hydrogen peroxide/gm palladium/hr at 40% selectivity. Selectivity is $$100\% \times \frac{\text{moles/hr H}_2\text{O}_2 \text{ leaving reactor}}{\text{moles/hr H}_2 \text{ consumed}}$$

After 100 hours, 9400 moles of hydrogen peroxide had been produced per mole of palladium and the catalyst had lost 30% of its initial activity.

The concentration of organic peroxide varied from 0.01 to 0.03 M during the first 72 hours of the run.

EXAMPLE 9

The effect of decreasing hydrochloric acid concentration in a continuous process was determined by changing hydrochloric acid concentration during a run otherwise as in Example 8. The following results were obtained:

| HCl Conc., M | Selectivity, % |
| --- | --- |
| 0.01 | 39 |
| 0.005 | 43 |
| 0.0025 | 43 |
| 0.0013 | 47 |
| 0 | 5 |

EXAMPLE 10

The influence of sulfuric acid concentration on reaction rate and selectivity during a continuous reaction was determined in an experiment otherwise as in Example 8, but in which a homogeneous mixture of 200 g of 0.5% palladium on carbon and 200 g of carbon black were employed as the catalyst bed. Results were:

| $H_2SO_4$ Conc., N | $H_2O_2$ Conc., M | Selectivity, % |
| --- | --- | --- |
| 0.3 | 0.22 | — |
| 0.2 | 0.27 | 46 |
| 0.1 | 0.33 | 47 |
| 0.05 | 0.45 | 51 |
| 0.025 | 0.62 | 49 |

EXAMPLE 11

The long term effect of simultaneous reduction in concentrations of hydrochloric and sulfuric acids on palladium dissolution and catalyst life was investigated in an experiment as in Example 8, except the sulfuric acid and hydrochloric acid concentrations were varied. The run time was 285 hours, for the first 185 hours of which acid concentrations were 0.05 N sulfuric acid and 0.0013 N hydrochloric acid. The initial peroxide accumulation rate was 1.12 mole hydrogen peroxide/gm palladium/hr at 50% selectivity, with 0.55 M hydrogen peroxide in the effluent. Initial palladium losses were high (0.88 mg/L) due to release of entrained catalyst "fines" in the bed. Subsequent losses (after about 12 hr) were relatively constant (0.2 ppm). At 185 hours, 18,500 moles of hydrogen peroxide had been accumulated per mole of palladium catalyst. The concentration of organic peroxides never exceeded 0.05 M and typically was 0.02 M.

After 185 hours' operation, the sulfuric acid concentration was reduced to 0.025 N without loss of selectivity. Reduction to 0.012 N resulted in loss of selectivity.

During the last 30 hours' run time, the concentrations of sulfuric acid and hydrochloric acid were increased to 0.1 N and 0.01 N, respectively, for 20 hours and again reduced to 0.025 N and 0.0013 N. This treatment resulted in restoring the catalyst to 69% of its initial activity.

After 285 hours of operation, 25,000 moles hydrogen peroxide were produced per mole of palladium with only 31% loss of catalyst activity. This corresponds to a 190 fold increase in catalyst half-life over that obtained in a batch operation.

EXAMPLE 12

Regeneration of partially deactivated catalyst was demonstrated in a run in which the reactor described in Example 8 was packed with 200 g of a 1:1 homogeneous mixture of 0.5% palladium on carbon and carbon black. Solvent (80:20 acetone:water by volume containing 100 ppm of each of sodium meta- and pyrophosphates and which was 0.1 N in sulfuric acid and 0.01 N in hydrochloric acid) was passed upwardly through the bed at a rate of 0.813 L/hr. Hydrogen and oxygen were introduced concurrently upwardly through the packed bed at rates of 1.95 and 4.7 scfh, respectively, and 150 psig. The temperature was 27° C.

The initial concentration of hydrogen peroxide in the effluent was 0.55 M, decreasing to 0.44 M owing to mechanical difficulties with the apparatus. At the end of 80 hours, the output of hydrogen peroxide had decreased to 0.36 M, corresponding to 18% loss of catalyst activity. The temperature in the reactor was increased to 49° C. and returned to 27° C. over a period of 5 hours, whereupon hydrogen peroxide output returned to 0.44 M.

EXAMPLE 13

Acetone solutions used in Examples 8–12 were replaced by 80:20 methanol:water by volume containing 0.2% by weight of formaldehyde and 100 ppm of each of sodium meta- and pyrophosphates and which was 0.035 N in sulfuric acid and 0.0013 N in hydrochloric acid. The solvent was passed upwardly through a catalyst bed of 465 g of a 1:1 homogeneous mixture of 0.2% palladium on carbon and carbon black at the rate of 1.5 L/hr.

Hydrogen and oxygen were introduced upwardly at rates of 1.8 scfh and 26.9 scfh, respectively. The pressure and temperature were 100 psig and 7° C. After 15 hours the hydrogen peroxide accumulation rate was 0.83 mol hydrogen peroxide/gm palladium/hr at 77% selectivity with 0.28 M hydrogen peroxide in the effluent. Increasing the pressure to 150 psig increased the rate to 0.99 mol hydrogen peroxide/gm palladium/hr with selectivity of 80%.

EXAMPLE 14

Removal of palladium by activated carbon was demonstrated in experiments in which about 200 ml of 80:20 acetone:water (by volume) solution containing 1% of $H_2O_2$ was placed in a borosilicate flask previously passivated toward hydrogen peroxide decomposition by soaking in 7% aqueous hydrogen peroxide solution. The volume of solution was brought to 200 ml by addition of the indicated amount of $PdCl_2$ solution. Following addition of $PdCl_2$ solution, 12×16 PCB carbon (Calgon) was added to the unstirred solution. The time at which the carbon was added was designated $T_o$. After 0.5 hours, aliquots were withdrawn and analyzed for dissolved palladium by atomic absorption spectroscopy.

The following results were obtained:

| Acetone/Water Solution Containing 1% $H_2O_2$ | | |
|---|---|---|
| ppm Dissolved Palladium | | mg/1 hr. |
| Initial | 0.5 hr | Redeposition Rate |
| 500 | 76.0 | 763 |
| 100 | 20.3 | 144 |
| 20 | 2.65 | 31 |

These results suggest that a combination of soluble palladium and hydrogen peroxide promote redeposition of palladium and catalyst deactivation resulting therefrom.

EXAMPLE 15

Removal of soluble palladium from hydrogen peroxide solution by an ion-exchange resin was demonstrated in an experiment in which anion-exchange resin (Amberlite IRA-938 in the chloride form, 10 g) was charged to a 500 ml Erlenmeyer flask containing 200 ml of aqueous solution which was 1.6 M with respect to $H_2O_2$, 0.1 N in $H_2SO_4$ and 0.01 N in HCl and contained 500 ppm of palladium (as $PdCl_4^=$). The mixture was maintained at 24° C. and swirled mechanically. Analysis of palladium content of aliquots removed at intervals was done by atomic absorption spectroscopy. Results were:

| Time (hr) | $PdCl_4^=$ (ppm) |
|---|---|
| 0 | 398 |
| 0.6 | 21.3 |
| 1 | 11.1 |
| 4 | 1 |
| 6 | 0.3 |

What is claimed is:

1. In a process for producing hydrogen peroxide by contacting a mixture of gases comprising hydrogen and oxygen with a palladium catalyst supported on a carbon base in a reaction vessel in the presence of an acidic aqueous liquid containing 70 to 95% by volume of an oxygenated or nitrogeneous organic solvent capable of inhibiting the decomposition of thus-produced hydrogen peroxide, the improvement comprising prolonging effective catalyst life and improving hydrogen peroxide yield by continuously removing from the acidic aqueous liquid in the reaction vessel palladium salts produced by solubilization of the palladium catalyst, wherein hydrogen, oxygen and acidic aqueous liquid are cocurrently passed upwardly through a packed bed of palladium on a carbon base.

2. The process of claim 1, wherein the aqueous acidic liquid contains 70-90% by volume of acetone or methanol and is 0.0005-0.005 N in hydrochloric acid and 0.025-0.2 N in sulfuric acid.

3. The process of claim 2, wherein catalyst is reactivated by increasing the concentration of hydrochloric acid to about 0.01 N and of sulfuric acid to about 0.1 N for 20 hours.

4. The process of claim 1, wherein the acidic aqueous liquid is 0.0005-0.005 N in hydrochloric acid.

5. The process of claim 1, whereiin the overall acidity of the acidic aqueous liquid is 0.0255-0.205 N.

6. The process of claim 1, wherein the acidic aqueous liquid contains a ketone, aldehyde or alcohol of up to 4 carbon atoms.

7. The process of claim 1, wherein deactivated catalyst is regenerated by increasing the reaction temperature to about 50° C. and returning the reaction temperature to 0°-30° C. during 5 hours.

8. The process of claim 1, wherein a continuous plug flow reaction is carried out.

9. The process of claim 1, wherein the acidic aqueous liquid contains 70-90% by volume of an alcohol or ketone.

10. The process of claim 1, wherein the acidic aqueous liquid contains 70 to 90% by volume of methanol or acetone.

11. In a process for producing hydrogen peroxide by contacting a mixture of gases comprising hydrogen and oxygen with a palladium catalyst supported on a carbon base in a reaction vessel in the presence of an acidic aqueous liquid capable of inhibiting the decomposition of the thus-produced hydrogen peroxide, the improvement comprising prolonging effective catalyst life and improving hydrogen peroxide yield by continuously removing from the acidic aqueous liquid in the reaction vessel palladium salts produced by solubilization of the palladium catalyst, wherein removal of palladium salts is effected by an ion-exchange resin external to the reaction vessel in which hydrogen peroxide is prepared and aqueous liquid freed of palladium salts is returned to the reaction vessel.

* * * * *